United States Patent
Cheong et al.

(10) Patent No.: US 8,214,896 B2
(45) Date of Patent: Jul. 3, 2012

(54) METHOD OF SECURING USB KEYBOARD

(75) Inventors: Seong Ho Cheong, Seoul (KR); Yong Hoon Kim, Osan-Si (KR)

(73) Assignee: Kings Information & Network, Seoul (KR)

( * ) Notice: Subject to any disclaimer, the term of this patent is extended or adjusted under 35 U.S.C. 154(b) by 1034 days.

(21) Appl. No.: 12/167,574

(22) Filed: Jul. 3, 2008

(65) Prior Publication Data

US 2009/0313403 A1   Dec. 17, 2009

(30) Foreign Application Priority Data

Jun. 16, 2008   (KR) ........................ 10-2008-0056399

(51) Int. Cl.
*G06F 21/00*   (2006.01)
(52) U.S. Cl. .......................................... 726/22; 710/67
(58) Field of Classification Search .................. 726/22; 710/67
See application file for complete search history.

(56) References Cited

U.S. PATENT DOCUMENTS

| 6,912,605 | B1 * | 6/2005 | Wright | 710/60 |
| 2007/0294441 | A1 * | 12/2007 | Collins | 710/67 |
| 2008/0313370 | A1 * | 12/2008 | Kang et al. | 710/67 |
| 2010/0257284 | A1 * | 10/2010 | Kim | 710/9 |

FOREIGN PATENT DOCUMENTS

| KR | 100537930 B1 | 12/2005 |
| WO | 2008048035 A1 | 4/2008 |

* cited by examiner

*Primary Examiner* — Michael S McNally
(74) *Attorney, Agent, or Firm* — The Webb Law Firm (57) ABSTRACT

Provided is a method of securing a Universal Serial Bus (USB) keyboard. According to the method, a keyboard security operation is performed at a host controller driver level, which is one level lower than a USB hub driver level. Thus, it is possible to rapidly and effectively prevent a malicious program from leaking information input from a keyboard that is in communication with a main frame and transfers data via a USB.

10 Claims, 6 Drawing Sheets

METHOD OF SECURING USB KEYBOARD

CROSS-REFERENCE TO RELATED APPLICATION

This application claims priority to and the benefit of Korean Patent Application No. 2008-56399, filed Jun. 16, 2008, the disclosure of which is incorporated herein by reference in its entirety.

BACKGROUND

1. Field of the Invention

The present invention relates to a method of securing a Universal Serial Bus (USB) keyboard, and more particularly, to a USB keyboard security method whereby a keyboard security operation is performed at a host controller driver level, which is one level lower than a USB hub driver level, to rapidly and effectively prevent a malicious program from leaking information input from a keyboard that is in communication with a main frame and transfers data via a USB.

2. Discussion of Related Art

Continuing development of the Internet has recently led to increasing unlawful leakage of confidential information from Personal Computers (PCs). Although there are existing security software such as anti-spyware programs, anti-virus software, firewalls, etc., they are reactive and not responsive to fast-evolving malware threats, because a process of collecting and analyzing those hacking tools and patching an anti-spyware program, anti-virus software, a firewall, etc., are required. Furthermore, until the new remedy or patch is applied to the user, his or her PC is still vulnerable to the new hacking tool.

Therefore, there is need of technology for preventing unlawful leakage of personal information from the time it is input by a user through a keyboard. Many keyboards have been developed using the Personal System (PS)/2 standard, but USB keyboards are more common nowadays because they offer the convenience of easy installation and they do not require a system reboot.

Such a USB keyboard is connected to a body of personal computer to exchange messages with an operating system while communication is performed between the body of personal computer and peripheral devices of the computer system through the exchange of packets containing data rather than the exchange of electrical signals.

However, the Internet has become widely used in homes as well as offices, and personal information leakage through exploited Internet security vulnerabilities is on the rise. For example, personal information input for connecting to a website, a password used for Internet banking, etc., are frequently exposed.

To solve this problem, a method applied to a USB hub driver level in a kernel region to secure data input from a USB keyboard has been disclosed in Korean Patent Application No. 2006-100366 "Apparatus and Method for Preservation of USB keyboard" filed by the present applicant on Oct. 16, 2006.

However, programs have been developed to monitor all information exchanged between USB devices and a main frame at a host controller driver level, which is one level lower than a USB hub driver level. One particular program called "USBmonitor" monitors USB packets. Consequently, keyboard information is frequently leaked for malicious purposes.

SUMMARY OF THE INVENTION

The present invention is directed to providing a method of securing a Universal Serial Bus (USB) keyboard whereby a keyboard security operation is performed at a host controller driver level, which is one level lower than a USB hub driver level, to rapidly and effectively prevent a malicious program from leaking information input from a keyboard that is in communication with a main frame and transfers data via a USB.

One aspect of the present invention provides a method of securing a USB keyboard, comprising: (a) selecting device objects for the USB keyboard at a USB hub driver level and a host controller miniport driver level; (b) storing an address of an Input/Output Request Packet (IRP) for a key input of the USB keyboard among IRPs passing through a device object selected at the USB hub driver level; (c) registering a completion routine of a secure keyboard in an IRP having the stored address among IRPs passing through a device object selected at the host controller miniport driver level; (d) when a key input is made from the USB keyboard, calling the registered completion routine of a secure keyboard, obtaining key data recorded in a corresponding IRP, and determining whether or not the key data is a protection target; (e) when it is determined in step (d) that the key data is a protection target, encoding the key data and deleting the original protection-target key data among input key data; and (f) decoding the encoded protection-target key data and outputting the decoded protection-target key data at a position where a user wants to input the key data.

The selecting of the device object for the USB keyboard at the USB hub driver level in step (a) may comprise: (a-1) acquiring a list of device objects of a USB hub driver; (a-2) selecting device objects whose member variable is not null from among the device objects acquired in step (a-1); (a-3) acquiring a list of device objects connected with a Human Interface Device (HID) class/miniclass driver among the device objects selected in step (a-2); and (a-4) acquiring a list of device objects related to an HID keyboard among the device objects acquired in step (a-3).

Step (a-1) may comprise: a first process of detecting a driver object of the USB hub driver; a second process of obtaining a pointer of a first device object from a member variable of the driver object; and a third process of continuously obtaining a pointer of a next device object from a member variable of the device object to acquire the list of device objects.

Step (a-3) may comprise, when a member variable of a device object indicated by a member variable of a device object among the device objects selected in step (a-2) is the same as a pointer of a driver object of the HID class/miniclass driver, determining that the device object selected in step (a-2) is connected with the HID class/miniclass driver.

Step (a-4) may comprise checking whether or not descriptors of the device objects acquired in step (a-3) indicate an HID keyboard.

The selecting of the device object for the USB keyboard at the host controller miniport driver level in step (a) may comprise: (a-1') replacing data processing function addresses of all host controller miniport drivers with a secure keyboard service routine address; (a-2') storing an address of an IRP transferred to the host controller miniport driver level through the device object selected at the USB hub driver level; (a-3') waiting until the IRP whose address is stored in step (a-2') is transferred to a host controller miniport driver, and selecting the device object to which the IRP is transferred at the host controller miniport driver level; and (a-4') restoring the data processing function addresses of all the host controller miniport drivers replaced in step (a-1') except a data processing function address of the host controller miniport driver connected with the device object selected in step (a-3+).

Step (c) may comprise, when an IRP among IRPs passing through the device object selected at the host controller miniport driver level has the same address as the stored address, rechecking whether or not the IRP is intended for a key input of the USB keyboard, and when the IRP has the same address as the stored address, registering the completion routine of a secure keyboard in the IRP.

Step (c) may comprise, when a completion routine has been already registered in the IRP, replacing the previously registered completion routine with the completion routine of a secure keyboard, and separately storing the previously registered completion routine in a specific space.

The method may further comprise: when it is determined in step (d) that the key data is not a protection target, terminating the completion routine.

The terminating of the completion routine may comprise, when a previously registered completion routine exists in the IRP, calling the previously registered completion routine.

Another aspect of the present invention provides a recording medium storing a program for executing the above described method of securing a USB keyboard.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
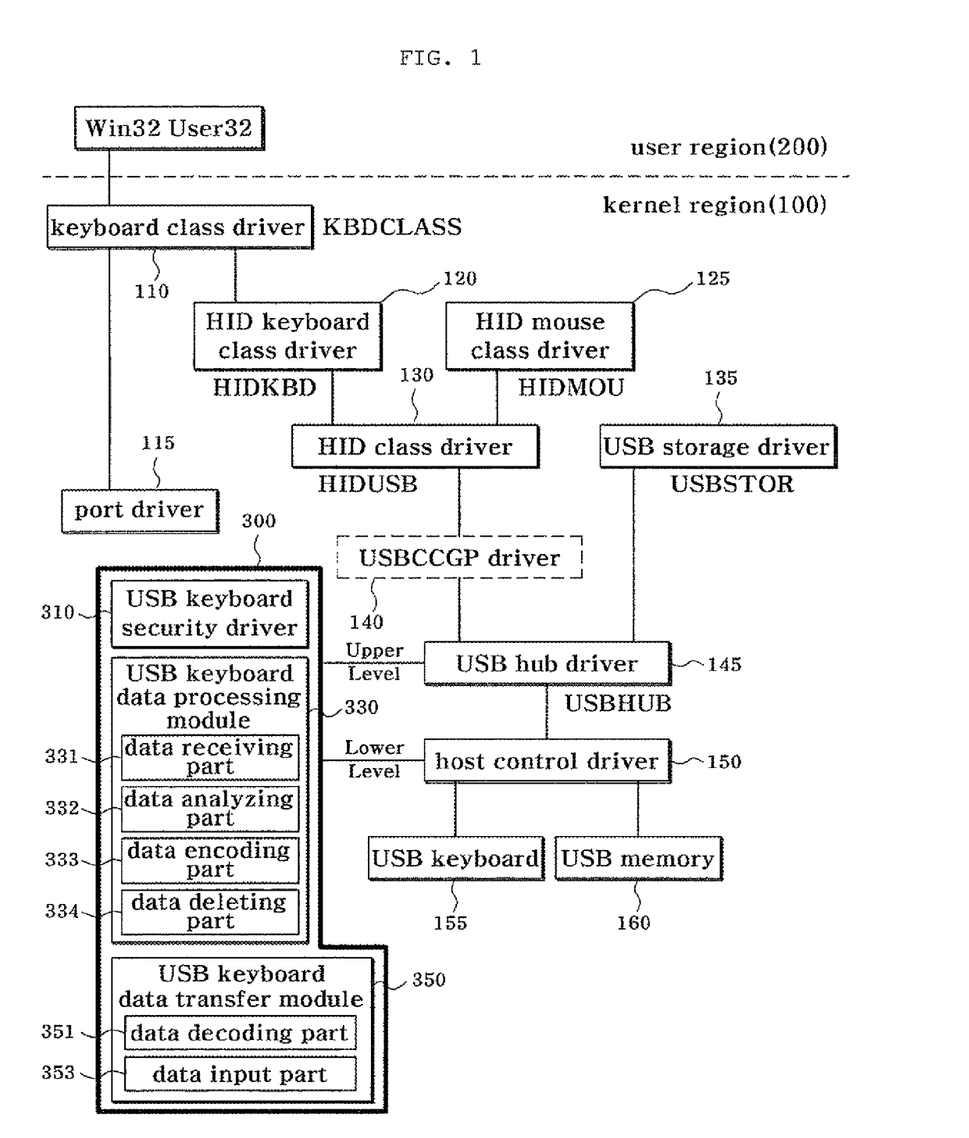
FIG. 1 is a block diagram showing a Universal Serial Bus (USB) driver structure for implementing a method of securing a USB keyboard according to an exemplary embodiment of the present invention.
Figure 2:
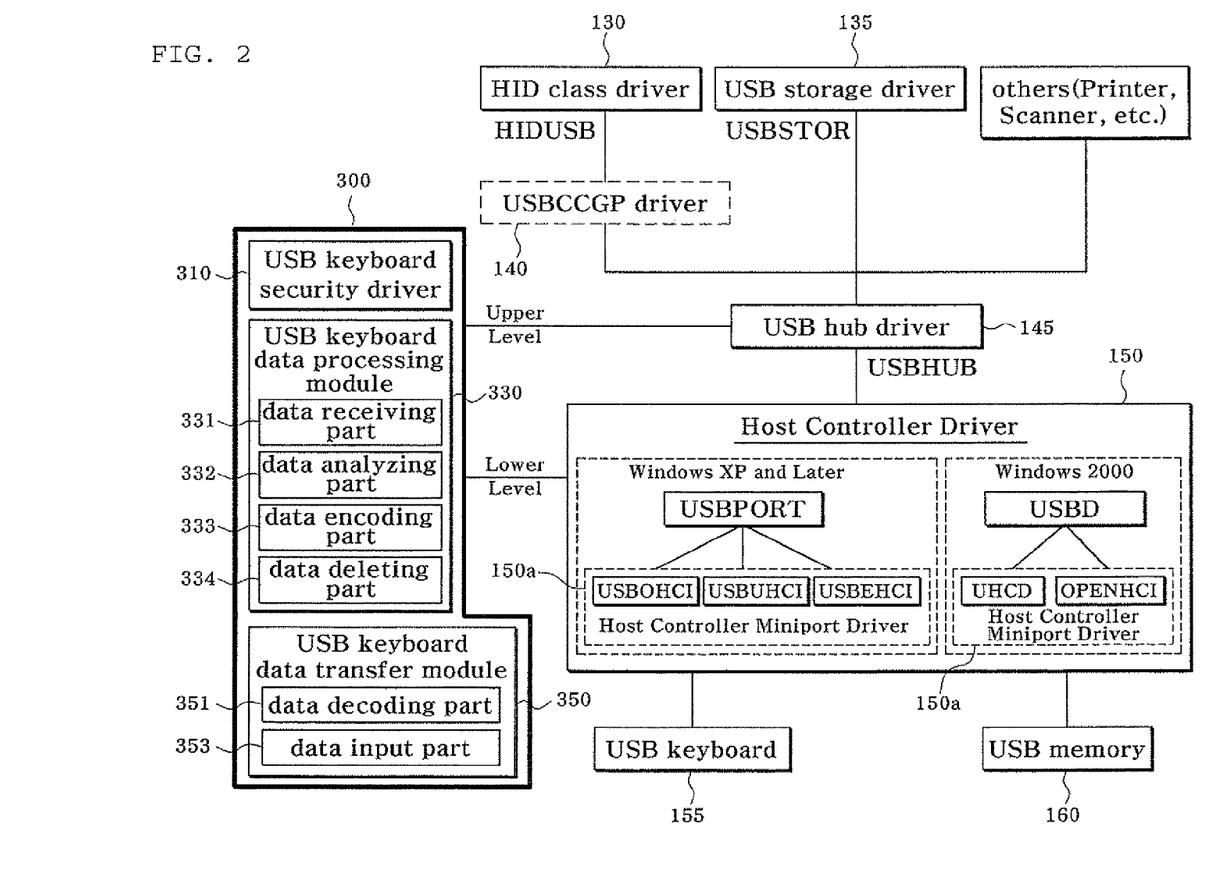
FIG. 2 is a block diagram illustrating the detailed structure of a host controller driver of FIG. 1.

FIG. 1 is a block diagram showing a Universal Serial Bus (USB) driver structure for implementing a method of securing a USB keyboard according to an exemplary embodiment of the present invention, and FIG. 2 is a block diagram illustrating the detailed structure of a host controller driver of FIG. 1.

Referring to FIGS. 1 and 2, the structure of a USB driver, which includes a USB keyboard security device 300 applied to implement the method of securing a USB keyboard according to an exemplary embodiment of the present invention, is roughly divided into a kernel region 100 and a user region 200.

Here, the kernel region 100 is the core of a computer operating system and provides various basic services to all other parts of the operating system. The kernel region 100 is also referred to as a "nucleus".

The kernel region 100 basically includes a keyboard class driver 110, a port driver 115, a Human Interface Device (HID) keyboard class driver 120, an HID mouse class driver 125, an HID class/miniclass driver 130, a USB storage driver 135, a USB Common Class Generic Parent (USBCCGP) driver 140, a USB hub driver 145, a host controller driver 150, a USB keyboard 155, a USB memory 160, and so on.

Meanwhile, the user region 200 is located at the outermost part of the operating system and serves to process user commands. The user region 200 is also referred to as a "cell".

In particular, to protect data input from the USB keyboard 155, the keyboard security device 300 implementing the method of securing a USB keyboard according to an exemplary embodiment of the present invention is installed in connection with the USB hub driver 145 and the host controller driver 150 in the kernel region 100.

The operating system processes the data input from the USB keyboard 155 without installation or activation of the USB keyboard security device 300 as described below.

First, when the USB keyboard 155 is connected to a Personal Computer (PC), a driver corresponding to the USB keyboard 155 is loaded and sends a WM_DEVICECHANGE message to an application that is being executed, such that the application performs an operation required for the new device.

Then, the completely installed USB keyboard 155 is sequentially connected with driver devices such as the host controller driver 150, the USB hub driver 145, the USBCCGP driver 140 and the HID class/miniclass driver 130.

Here, the host controller driver 150 is connected with a physical USB device. For example, the host controller driver 150 consists of USBPORT and three host controller miniport drivers 150a, i.e., USBOHCI, USBUHCI and USBEHCI, in Windows XP and later, and consists of USBD and two host controller miniport drivers 150a, i.e., UHCD and OPENHCI, in Windows 2000.

The USB hub (bus) driver (USBHUB, USBHub.sys) 145 serves to distribute data input from the physical USB device to the corresponding client device drivers.

Here, main client devices include, for example, an audio component (e.g., a speaker), a communication device (e.g., a modem), an HID (a device whereby a user directly inputs data to a computer, e.g., a keyboard, a mouse and a joystick), a display (e.g., a monitor), physical feedback devices (e.g., a force feedback joystick), a power supply (e.g., an uninterruptible power supply), a printer, a mass storage device (e.g., a hard drive) and a hub.

The USBCCGP driver (USBccgp.sys) 140 effectively processes a composite USB device, which performs two or more functions through one USB connection, in, for example, Windows XP.

The HID class/miniclass driver (HIDUSB, HIDUSB.sys and HIDClass.sys) 130 sends USB data input from an HID to the corresponding class driver, and the corresponding class driver processes the USB data and transfers it to the operating system.

Here, keyboard data is transferred to the keyboard class driver (KBDCLASS, kbdclass.sys) 110, which is the keyboard processing device of the operating system, through the HID keyboard class driver (HIDKBD, kbdhid.sys) 120.

More specifically, all the data of a USB device is transferred to upper level drivers through the USB hub driver 145. Here, the data is transferred to the HID class/miniclass driver 130 when the connected USB device is an HID, and to the USB storage driver (USBSTOR, usbstor.sys) 135 when the connected USB device is a storage device.

For example, when the connected HID USB device is a composite USB device in Window XP, data is transferred from the USB hub driver 145 to the USBCCGP driver 140 and again from the USBCCGP driver 140 to the HID class/miniclass driver 130.

According to which one of a keyboard, a mouse and a joystick is the connected device, the HID class/miniclass driver 130 is connected to the HID keyboard class driver 120 or the HID mouse class driver (HIDMOU) 125.

The HID keyboard class driver 120 is connected with the keyboard class driver (KBDCLASS) 110, which is also connected with the port driver 115 for a Personal System (PS)/2 keyboard.

Here, the port driver 115 is a widely used i8042 port driver and serves to process input data through an input data path set by an interrupt handler (not shown).

Figure 3:
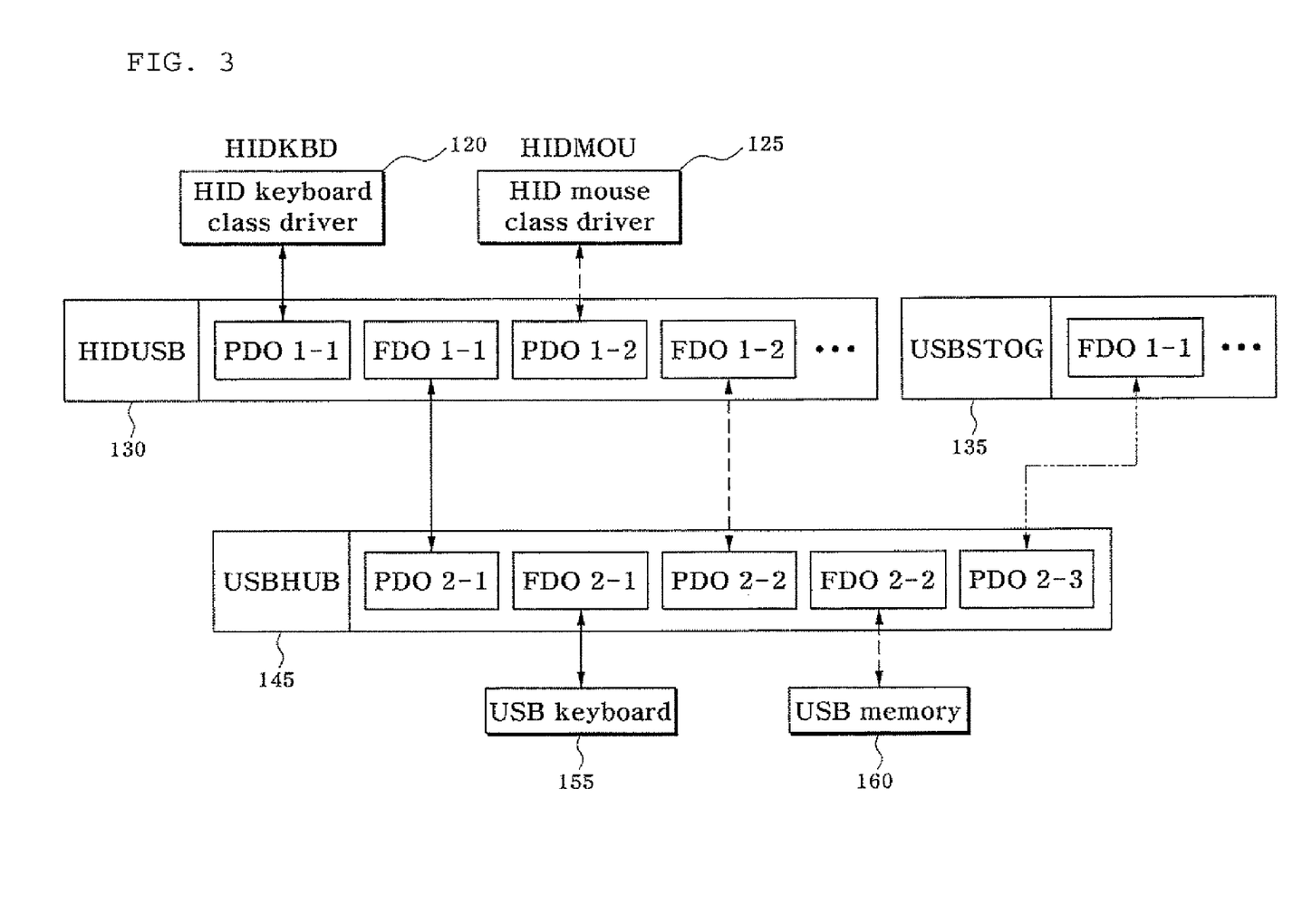
FIG. 3 is a block diagram of a structure connected between a USB hub driver and a Human Interface Device (HID) class/miniclass driver of FIG. 1.

FIG. 3 is a block diagram of a structure connected between the USB hub driver 145 and the HID class/miniclass driver 130 of FIG. 1.

Referring to FIG. 3, a driver object used for Input/Output (I/O), e.g., the USB hub driver 145 and the HID class/miniclass driver 130, generally has a Physical Device Object (PDO) and a Functional Device Object (FDO).

Here, the PDO is a device object for realizing the main function of a driver, and the FDO is a device object for transferring data to a lower-level driver in the form of an I/O Request Packet (IRP).

Each driver object has a PDO and an FDO and is thereby connected with a next-level driver object.

In other words, when the USB keyboard 155 is connected to the PC, the operating system transfers a USB Request Block (URB), which is a structure for receiving keyboard data, to the host controller driver 150 as a parameter of an IRP.

Afterwards, when the USB keyboard 155 is pressed and generates keyboard input data, the keyboard input data is recorded in the URB and then transferred to the operating system after IRP completion.

Subsequently, the operating system that has processed the keyboard input data transfers again a URB for receiving next keyboard input data and waits for the USB keyboard 155 to be pressed again. In other words, the IRP generated by the operating system is not transferred to the host controller driver 150.

Meanwhile, the IRP generated by the operating system is transferred to a PDO of a driver at a level right below the operating system, and the PDO generates a new IRP for performing an IRP operation requested by the operating system and transfers the new IRP to a PDO of a driver at a lower level through an FDO. According to the function of each driver, the driver may have a PDO or FDO alone.

The USB keyboard security device 300 employed in an exemplary embodiment of the present invention and installed in connection with the USB hub driver 145 and the host controller driver 150 in the kernel region 100 to protect data input from the USB keyboard 155 will be described in detail below.

The USB keyboard security device 300 employed in an exemplary embodiment of the present invention comprises a USB keyboard security driver 310, a USB keyboard data processing module 330 and a USB keyboard data transfer module 350.

To obtain data input from the USB keyboard 155, the USB keyboard security driver 310 serves to replace an original function of the host controller miniport drivers 150a existing in the host controller driver 150 with a specific function for performing a keyboard security operation.

Here, the original function is used by the operating system to process keyboard data, which is a major function processing an IRP_NJ_INTERNAL_DEVICE_CONTROL among a plurality of functions used by the operating system to process keyboard data. By replacing the original function with the specific function for performing a keyboard security operation, the keyboard security operation is started.

At each of the USB hub driver level (upper level) and the host controller driver level (lower level), the USB keyboard security driver 310 serves to analyze an IRP for inputting key information of the USB keyboard 155 and accurately select a device object related to the USB keyboard 155.

The USB keyboard data processing module 330 serves to receive the key input data obtained from the USB keyboard security driver 310 first of all and process it through analysis, encoding and deletion processes.

The USB keyboard data processing module 330 comprises a data receiver 331 for receiving input data obtained from the USB keyboard security driver 310 first of all, a data analyzer 332 for analyzing input data to be protected, i.e., protection-target input data, among the input data received from the data receiver 331, a data encoder 333 for encoding the protection-target input data analyzed by the data analyzer 332, and a data deletion unit 334 for deleting the protection-target input data among the input data received from the data receiver 331 not to be recognized by the operating system.

The USB keyboard data transfer module 350 serves to decode the input data processed by the USB keyboard data processing module 330 and output the decoded input data to a position where a user wants to input the input data.

The USB keyboard data transfer module 350 comprises a data decoder 351 for decoding the input data encoded by the USB keyboard data processing module 330 to be processed by the operating system, and a data input unit 353 for outputting the input data decoded by the data decoder 351 to the position where the user wants to input the input data.

Figure 4:
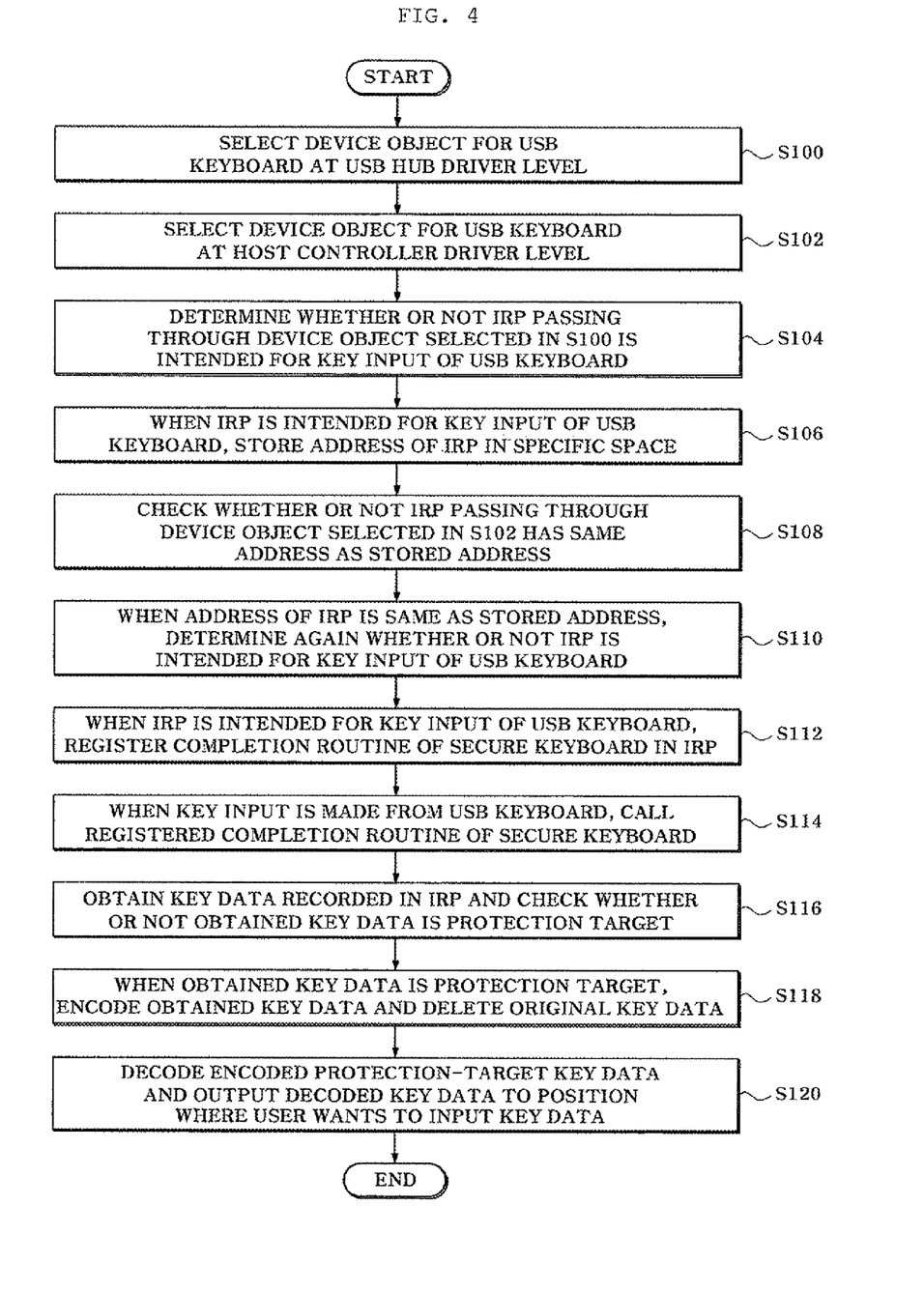
FIG. 4 is a flowchart showing a method of securing a USB keyboard according to an exemplary embodiment of the present invention.
Figure 5:
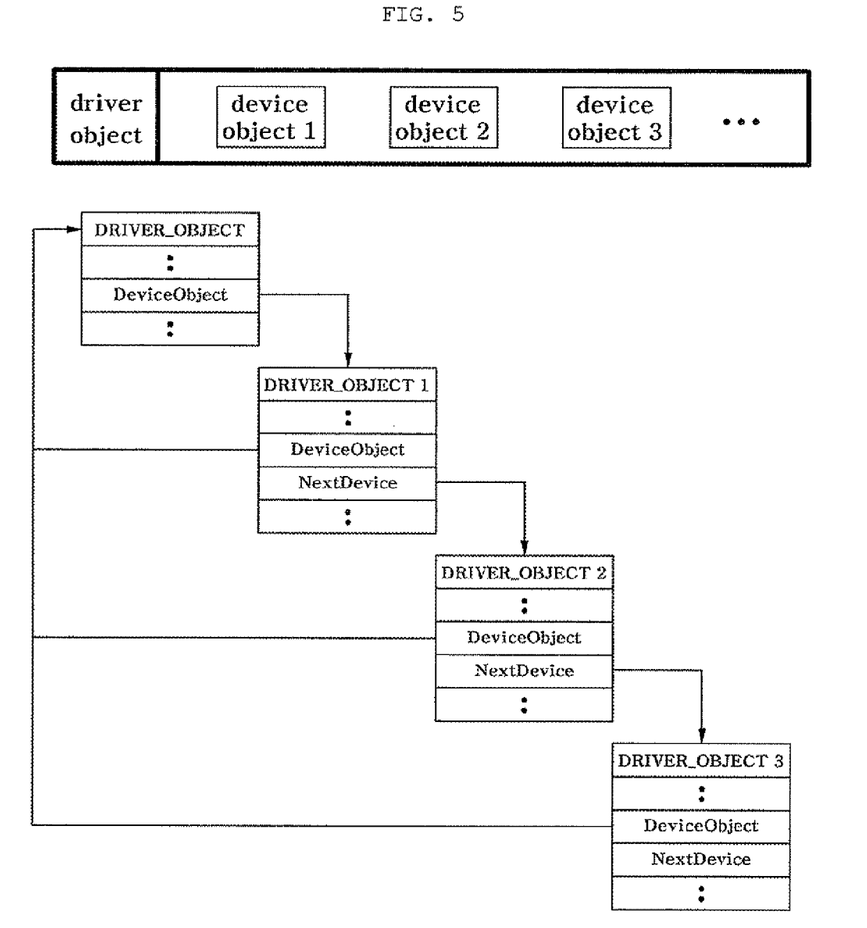
FIG. 5 illustrates a process of acquiring a list of device objects included in a USB hub driver.
Figure 6:
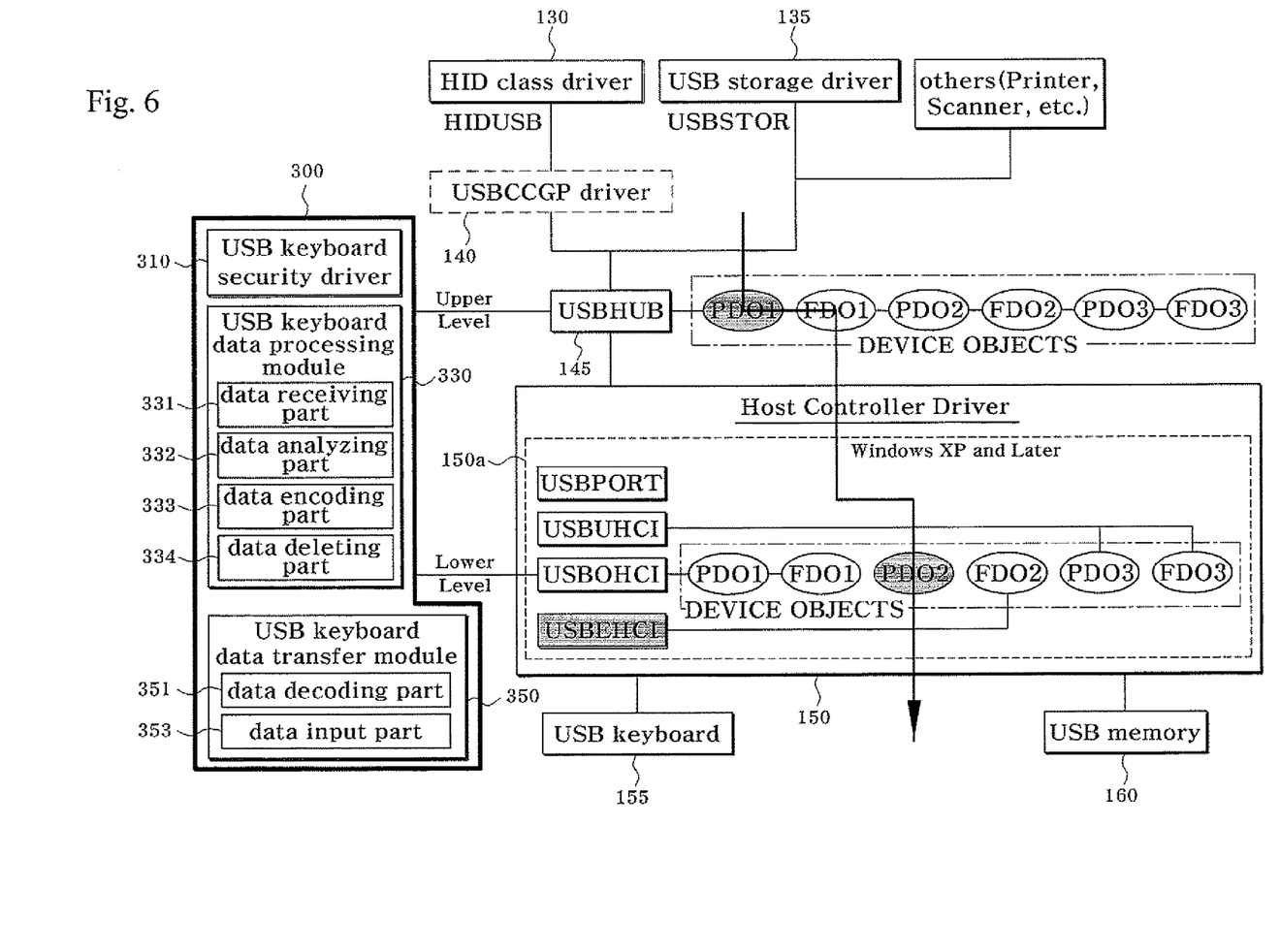
FIG. 6 illustrates a process of searching for device objects related to a USB keyboard among device objects included in a USB hub driver and a host controller miniport driver.

FIG. 4 is a flowchart showing a method of securing a USB keyboard according to an exemplary embodiment of the present invention, FIG. 5 illustrates a process of acquiring a list of device objects included in a USB hub driver, and FIG. 6 illustrates a process of searching for device objects related to a USB keyboard among device objects included in a USB hub driver and a host controller miniport driver.

First, the host controller driver 150 will be described again with reference to FIGS. 1 to 6. All communication information between a system and external USB devices passes through the host controller driver 150. In other words, the host controller driver 150 serves as a common communication path used by all the external USB devices such as a USB memory drive, a USB mouse, a USB printer, etc., as well as the USB keyboard 155.

This is enabled because the USB standard has been set already, and all external USB devices conforming to the standard can communicate using the same method. It is important for the host controller driver 150 to select and protect data of the USB keyboard 155 alone on the basis of the reasons.

To this end, the USB keyboard security device 300 employed in an exemplary embodiment of the present invention uses the USB hub driver level (upper level), which is a conventional protection level.

In other words, the USB keyboard security device 300 operates at the USB hub driver level (upper level) and the host controller driver level (lower level).

At the USB hub driver level, information for the USB keyboard 155 only can be separated. IRPs transferred through the USB hub driver level are information data for processing specific commands, and an IRP for processing key input data of the USB keyboard 155 is analyzed for keyboard security. The IRP is transferred as is to the host controller driver level.

The host controller driver level is a lower level in which data from a plurality of external USB devices is transferred, and it is a little difficult to separate information for the USB keyboard 155 only.

Therefore, the USB keyboard security device 300 employed in an exemplary embodiment of the present invention checks an IRP to be protected at the USB hub driver level and protects the checked IRP for keyboard security at the host controller driver level on the basis that an IRP passed through the USB hub driver level is transferred to the host controller driver 150.

Here, it must be considered which one of the host controller miniport drivers 150*a* existing in the host controller driver 150 the IRP related to the USB keyboard 155 passes through.

To correctly detect the host controller miniport driver 150*a* connected with the USB keyboard 155, the following operations are performed in sequence.

First, the USB keyboard security driver 310 selects device objects for the USB keyboard 155 at the USB hub driver level (step 100).

In step 100, first, a list of device objects included in the USB hub driver 145 is acquired. More specifically, the driver object of the USB hub driver 145 is obtained, the pointer of a first device object is obtained from a member variable that the obtained driver object has, and the pointer of a next device object may be obtained from the obtained member variable of the previous device object. In this way, a list of all device objects (PDO 2-1, FDO 2-1, PDO 2-2, FDO 2-2 and PDO 2-3) included in the USB hub driver 145 can be acquired.

Second, device objects (PDO 2-1, PDO 2-2 and PDO 2-3) whose member variables are not null are selected from among the device objects included in the USB hub driver 145.

Third, a list of device objects (PDO 2-1 and PDO 2-2) connected with the HID class/miniclass driver 130 is acquired from the device objects selected in the second step. More specifically, when one among the device objects selected in the second step has a member variable indicating a device object having the same member variable as the pointer of the driver object of the HIS class/miniclass driver 130, the device object is determined to be connected with the HID class/miniclass driver 130.

Fourth, a list of device objects (PDO 2-1) related to an HID keyboard is acquired from the device objects obtained in the third step. More specifically, descriptors of the device objects obtained in the third step are acquired, and it is checked whether or not the descriptors indicate the HID keyboard.

According to the above-described process, key input data of the USB keyboard 155 must be as close as possible to a physical device in order to be protected. For example, in Windows 2000, a plurality of PDOs and FDOs exist in the USB hub driver 145.

Data transferred through the FDOs of the USB hub driver 145 is received from any USB device, such as a USB keyboard, a USB mouse, a USB joystick and a USB storage device. Thus, it is difficult to select and protect only keyboard data among a large amount of data.

The PDOs of the USB hub driver 145 are classified into HIDs and storage devices according to which driver object between the HID class/miniclass driver 130 and the USB storage driver 135 the PDOs are connected to.

The HIDs are respectively connected to the FDOs of the HID class/miniclass driver 130 and the PDOs of the USB hub driver 145, and thus keyboard data may be received by a PDO of the USB hub driver 145 related to the USB keyboard 155.

For example, when a USB device is a composite device in Windows XP, the USBCCGP driver 140 is disposed between the USB hub driver 145 and the HID class/miniclass driver 130. In other words, when a wireless keyboard and a wireless mouse use one USB receiver, data of the USB wireless keyboard and data of the USB wireless mouse are transferred together to one FDO of the USBCCGP driver 140, and PDOs of the USBCCGP 140 are separately assigned to the keyboard and the mouse and respectively connected with FDOs of the HID class/miniclass driver 130, such that the keyboard data and the mouse data are separately transferred to the HID class/miniclass driver 130.

Therefore, in Windows 2000, a PDO for transferring keyboard data must be detected among the PDOs of the USB hub driver 145. And in Windows XP, a PDO for transferring keyboard data must be detected among the PDOs of the USB hub driver 145 and the USBCCHP driver 140.

The present invention will be described below with respect to the USB hub driver 145, but it is to be understood that the USBCCGP driver 140 is treated in the same way as the USB hub driver 145.

To detect a PDO that transfers data of the USB keyboard 155, the following process is used.

First, a DEVICE_OBJECT (a structure having data of a device object) list of the USB hub driver 145 is acquired. More specifically, to obtain the DEVICE_OBJECT list of the USB hub driver 145, the pointer of a DRIVER_OBJECT is obtained using an ObReferenceObjectByName( ) function and a name "\\Driver\\usbhub". The DeviceObject item of the DRIVER_OBJECT is the pointer of the DRIVER_OBJECT of a first device object.

Device objects are connected by chains, and a DEVICE_OBJECT.NextDevice item is the pointer of the DEVICE_OBJECT of a next device object. In this way, all DEVICE_OBJECTs of the device objects in the USB hub driver 145 can be obtained.

Second, PDOs are selected from the DEVICE OBJECTs. As described above, a PDO of the USB hub driver 145 is connected with an FDO of the HID class/miniclass driver 130, such that data can be exchanged between the USB hub driver 145 and the HID class/miniclass driver 130. To be exact, it can be said that an FDO of the HID class/miniclass driver 130 is attached to a PDO of the USB hub driver 145.

Among the obtained DEVICE_OBJECTs of the USB hub driver 145, device objects whose DEVICE_OBJECT.AttachedDevice is not null are PDOs. Here, a DEVICE_OBJECT.AttachedDevice is the pointer of the DEVICE_OBJECT of a device object attached to the corresponding device object.

Third, a device object of the USB hub driver 145 connected with an HID is detected. The DEVICE_OBJECT.DriverObject of a device object obtained from a DEVICE_OBJECT.AttachedDevice denotes the DRIVER_OBJECT pointer of a driver object having the device object. The value of the pointer is compared with the pointer of the DRIVER_OBJECT of the HID class/miniclass driver 130, such that it can be determined whether or not the device object of the USB hub driver 145 is attached to the HID device.

Here, the name of the HID class/miniclass driver 130 is used to obtain the DRIVER_OBJECT of the HID class driver/miniclass driver 130, but is not always the same as the original. When the USB keyboard 155 is connected to the PC and used, the driver name is not changed. However, when the keyboard driver of the USB keyboard 155 is installed to use functions of the USB keyboard 155, the name of the HID class/miniclass driver 130 may be changed. Thus, driver objects installed in the PC are checked to detect a driver object connected with the HID keyboard class driver 120, and the driver object must be identified with the HID class/miniclass driver 130.

Fourth, a device object of the USB hub driver 145 connected with an HID and related to a keyboard is detected. A USB device has a structure, that is, a descriptor for recognizing what the corresponding device is. A URB for obtaining the descriptor of a USBB_CONFIGURATION_DESCRIPTOR_TYPE is generated using a UsbBuildGetDescriptorRequest function.

The generated URB is attached as the parameter of the stack location of an IRP (I/O code: IOCTL_INTERNAL_USB_SUBMIT_URB) and sent to the above-selected PDO of the driver object of the USB hub driver 145 (IoCallDriver), thereby obtaining the descriptor of the device connected to the PDO. Using a USBD_ParseConfigurationDescriptorEx function, it is then checked whether or not the descriptor indicates the USB keyboard 155.

When the descriptor indicates the USB keyboard 155, the result of the USBD_ParseConfigurationDescriptorEx function may be the pointer of a USB_INTERFACE_DESCRIPTOR structure denoting an interface for providing the functions of the USB keyboard 155.

Next, the USB keyboard security driver 310 selects a device object for the USB keyboard 155 at the host controller driver level (lower level) (step 102).

In step 102, first, the addresses of data processing functions of all the host controller miniport drivers 150a in the host controller driver 150 are replaced with the address of a secure keyboard service routine.

In other words, the addresses of major functions processing IRP_MJ_INTERNAL_DEVICE_CONTROLs of all the host controller miniport drivers 150a existing in the host controller driver 150 are replaced with the address of the secure keyboard service routine for securing the USB keyboard 155.

Second, the address of an IRP that is transferred to the host controller driver level, which is the lower level, through the device object selected at the USB hub driver level in step 100 is stored.

Third, the operating system waits until the IRP whose address is stored in the second step is transferred to one of the host controller miniport drivers 150a. When the IRP is transferred to one of the host controller miniport drivers 150a, it is possible to correctly detect which one of device objects of the host controller miniport drivers 150a the IRP is transferred to.

Fourth, the device object is selected at the host controller driver level when the IRP is transferred to one of the host controller miniport drivers 150a. In other words, the device object detected when the same IRP whose address is stored in the second step is transferred is a device object directly connected with the USB keyboard 155 at the host controller driver level. Therefore, all IRPs passing through the device object are directly related to the USB keyboard 155.

Fifth, except the host controller miniport driver 150a connected with the device object selected at the host controller driver level in the fourth step, the addresses of the data processing functions (major functions) of all the host controller miniport drivers 150a replaced with the address of the secure keyboard service routine in the first step are restored.

Here, the reason why the data processing function of the host controller miniport driver 150a connected with the device object selected in the fourth step is not restored is that the USB keyboard security device 300 is a protection target.

FIG. 6 illustrates the flow of an IRP passing through the USB hub driver level. A thick arrow illustrated in FIG. 6 is assumed to be the flow of a keyboard IRP.

An IRP for receiving a key input passes through one device object PDO1 among device objects of the USB hub driver level, and is transferred through a specific device object PDO2 of one of the host controller miniport drivers 150a, for example, USBOHCI, at the host controller driver level.

Meanwhile, above-described steps 100 and 102 correspond to a process of detecting a specific device object through which a keyboard IRP passes from among device objects of the host controller driver level.

The device object PDO2 detected at the host controller driver level through steps 100 and 102 can exchange IRPs related to the USB keyboard 155 and also IRPs of other types, e.g., an IRP related to a USB mouse. Therefore, an operation of separating only IRPs related to the USB keyboard 155 from others is required. To this end, the device object PDO1 is continuously used at the USB hub driver level.

In other words, only IRPs related to the USB keyboard 155 pass through the device object PDO1 at the USB hub driver level. Therefore, when an IRP passing through the device object PDO1 is previously stored, IRPs related to the USB keyboard 155 can be separated from others by comparing IRPs passing through the device object PDO2 at the host controller driver level with the previously stored IRP.

More specifically, it is first determined whether or not IRPs passing through the device object PDO1 selected at the USB hub driver level are intended for the key input of the USB keyboard 155 (step 104).

When it is determined in step 104 that an IRP is intended for the key input of the USB keyboard 155, the address of the IRP is stored in, for example, the global variable space of the USB keyboard security device 300 (step 106).

Subsequently, it is checked whether or not there is an IRP having the same address as the IRP stored in step 106 among IRPs passing through the device object PDO2 selected at the host controller driver level in step 102 (step 108).

When it is checked in step 108 that an IRP has the same address as the IRP stored in step 106, it is determined again whether the IRP is intended for the key input of the USB keyboard 155 (step 110) This is for increasing stability, and the determination method is the same as that used in step 104.

When it is finally checked in step 110 that the IRP is intended for the key input of the USB keyboard 155, the completion routine of a secure keyboard is registered in the IRP (step 112).

Meanwhile, in step 112, when a completion routine has been already registered in the IRP, the previously registered completion routine may be replaced with the completion routine of a secure keyboard, and the previously registered completion routine may be separately stored in a specific space.

Subsequently, when a key input is made from the USB keyboard 155, the completion routine of a secure keyboard registered in the IRP is called (step 114), and then key data recorded in the IRP is obtained from the called completion routine of a secure keyboard to check whether or not the obtained key data is a protection target (step 116).

When it is checked in step 116 that the obtained key data is a protection target, the obtained key data is encoded, and the original key data is deleted from input key data (step 118).

More specifically, data input by manipulating the USB keyboard 155 is received first of all and processed by the USB keyboard data processing module 330 through analysis, encoding and deletion processes.

The USB keyboard data processing module 330 receives data input by a user using the USB keyboard 155 first of all. In more technical terms, the secure keyboard service routine receives all IRP_MJ_INTERNAL_DEVICE_CONTROL IRPs transferred to the host controller miniport driver 150*a*. When any of the IRPs is intended for data of the USB keyboard 155, the pointer of a DEVICE_OBJECT transferred as the parameter of the secure keyboard service routine is the same as the DEVICE_OBJECT of the device object PDO2 for the USB keyboard 155 selected at the host controller driver level.

When data of the USB keyboard 155 is generated while an IRP having a URB is transferred and pending, it is stored in the URB and calls a completion routine set in the IRP. Thus, the completion routine set in the IRP for transferring the data of the USB keyboard 155 is replaced with a secure keyboard completion routine, such that the data of the USB keyboard 155 can be processed first of all.

Then, protection-target input data is analyzed among the received input data. The data of the USB keyboard 155 is transferred by 8 bytes at a time. Among the data, keyboard data to be protected must be selected and analyzed because it is different from that of a PS/2 keyboard.

Every time the state of a USB keyboard is changed, the new sate is stored in a URB as data of the USB keyboard and transferred. For example, when "A" key is pressed, data indicating that "A" key is pressed is transferred. When "A" key is released, data indicating that no key is pressed is transferred. In other words, data of a USB keyboard is generated only when a key is pressed and released. On the other hand, according to a PS/2 keyboard, when "A" key is pressed, "A" down data is generated until "A" key is released. And, when "A" key is released, "A" up data is generated.

Meanwhile, when two keys are input, that is, when "A" and "B" keys are pressed in sequence and then released in sequence, a signal indicating that "A" key is pressed, a signal indicating that "A" and "B" keys are pressed, a signal indicating that "B" key is pressed, and a signal indicating that no key is pressed are generated in sequence.

After the analysis, the analyzed protection-target input data is encoded and then deleted such that the operating system cannot recognize the protection-target input data among the received input data.

More specifically, 128-bit encoding is performed on the data of the USB keyboard 155 to safely transfer the data to an application module. And, only the protection-target data among the keyboard data must be deleted such that the operating system cannot receive the keyboard data received from the secure keyboard service routine.

Meanwhile, when it is checked in step 116 that the obtained key data is not a protection target, the completion routine of a secure keyboard is terminated. Here, when an original completion routine exists, the completion routine is terminated by calling the original completion routine. On the other hand, when an original completion routine does not exist, the USB keyboard security device 300 terminates the completion routine.

Finally, the USB keyboard data transfer module 350 decodes the protection-target key data encoded in step 118 and outputs the decoded protection-target key data to a position where the user wants to input the key data (step 120).

Meanwhile, the method of securing a USB keyboard according to an exemplary embodiment of the present invention can be stored on a computer-readable recording medium in the form of a computer-readable code. The computer-readable recording medium may be any recording device storing data that can be read by computer systems.

For example, the computer-readable recording medium may be a read-only memory (ROM), a random-access memory (RAM), a compact disk read-only memory (CD-ROM), a magnetic tape, a hard disk, a floppy disk, a mobile storage device, a non-volatile memory such as flash memory, an optical data storage device, and so on. Also, the recording medium may be carrier waves, e.g., transmission over the Internet.

In addition, the computer-readable recording medium may be distributed among computer systems connected via a communication network and stored and executed as a code that can be read by a de-centralized method.

According to the above-described inventive method of securing a USB keyboard, a keyboard security operation is performed at a host controller driver level, which is one level lower than a USB hub driver level, and thus it is possible to rapidly and effectively prevent a malicious program from leaking information input from the keyboard that is in communication with a main frame and transfers data via a USB.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of securing a Universal Serial Bus (USB) keyboard, comprising:
   (a) selecting device objects for the USB keyboard at a USB hub driver level and a host controller miniport driver level, wherein the selecting of a device object for the USB keyboard at the host controller miniport driver level comprises:
      (a-1') replacing data processing function addresses of all host controller miniport drivers with a secure keyboard service routine address;
      (a-2') storing an address of an IRP transferred to the host controller miniport driver level through the device object selected at the USB hub driver level;
      (a-3') waiting until the IRP whose address is stored in step (a-2') is transferred to a host controller miniport driver, and selecting the device object to which the IRP is transferred at the host controller miniport driver level; and
      (a-4') restoring the data processing function addresses of all the host controller miniport drivers replaced in step (a-1') except a data processin function of the host controller miniport driver connected with the device object selected in step (a-3');
   (b) storing an address of an Input/Output Request Packet (IRP) for a key input of the USB keyboard among IRPs passing through a device object selected at the USB hub driver level;
   (c) registering a completion routine of a secure keyboard in an IRP having the stored address among IRPs passing through a device object selected at the host controller miniport driver level;
   (d) when a key input is made from the USB keyboard, calling the registered completion routine of a secure keyboard, obtaining key data recorded in a corresponding IRP, and determining whether or not the key data is a protection target;

(e) when it is determined in step (d) that the key data is a protection target, encoding the key data and deleting the original protection-target key data among input key data; and (f) decoding the encoded protection-target key data and outputting the decoded protection-target key data at a position where a user wants to input the key data.

2. The method of claim 1, wherein the selecting of the device object for the USB keyboard at the USB hub driver level in step (a) comprises:

(a-1) acquiring a list of device objects of a USB hub driver;

(a-2) selecting device objects whose member variable is not null from among the device objects acquired in step (a-1);

(a-3) acquiring a list of device objects connected with a Human Interface Device (HID) class/miniclass driver among the device objects selected in step (a-2); and (a-4) acquiring a list of device objects related to an HID keyboard among the device objects acquired in step (a-3).

3. The method of claim 2, wherein step (a-1) comprises:

a first process of detecting a driver object of the USB hub driver;

a second process of obtaining a pointer of a first device object from a member variable of the driver object; and a third process of continuously obtaining a pointer of a next device object from a member variable of the device object to acquire the list of device objects.

4. The method of claim 2, wherein step (a-3) comprises, when a member variable of a device object indicated by a member variable of a device object among the device objects selected in step (a-2) is the same as a pointer of a driver object of the HID class/miniclass driver, determining that the device object selected in step (a-2) is connected with the HID class/miniclass driver.

5. The method of claim 2, wherein step (a-4) comprises checking whether or not descriptors of the device objects acquired in step (a-3) indicate an HID keyboard.

6. The method of claim 1, wherein step (c) comprises, when an IRP among IRPs passing through the device object selected at the host controller miniport driver level has the same address as the stored address, rechecking whether or not the IRP is intended for a key input of the USB keyboard, and when the IRP has the same address as the stored address, registering the completion routine of a secure keyboard in the IRP.

7. The method of claim 1, wherein step (c) comprises, when a completion routine has been already registered in the IRP, replacing the previously registered completion routine with the completion routine of a secure keyboard, and separately storing the previously registered completion routine in a specific space.

8. The method of claim 1, further comprising: terminating the completion routine when it is determined in step (d) that the key data is not a protection target.

9. The method of claim 8, wherein the terminating of the completion routine comprises, when a previously registered completion routine exists in the IRP, calling the previously registered completion routine.

10. A non-transitory computer-readable recording medium storing a program capable of executing the method of any one of claims 1-5 or 6-9.

* * * * *

UNITED STATES PATENT AND TRADEMARK OFFICE
CERTIFICATE OF CORRECTION

| | | |
|---|---|---|
| PATENT NO. | : 8,214,896 B2 | Page 1 of 1 |
| APPLICATION NO. | : 12/167574 | |
| DATED | : July 3, 2012 | |
| INVENTOR(S) | : Seong Ho Cheong et al. | |

It is certified that error appears in the above-identified patent and that said Letters Patent is hereby corrected as shown below:

Column 12, Line 52, Claim 1, delete "processin" and insert -- processing --

Signed and Sealed this
Twenty-third Day of October, 2012

David J. Kappos
*Director of the United States Patent and Trademark Office*